(12) United States Patent
Takeuchi

(10) Patent No.: US 6,734,942 B2
(45) Date of Patent: May 11, 2004

(54) LIQUID CRYSTAL DISPLAY DEVICE

(75) Inventor: Shu Takeuchi, Hyogo (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 6 days.

(21) Appl. No.: 10/095,553

(22) Filed: Mar. 12, 2002

(65) Prior Publication Data

US 2002/0131009 A1 Sep. 19, 2002

(30) Foreign Application Priority Data

Mar. 14, 2001 (JP) .................................. 2001-072122

(51) Int. Cl.[7] ............................................. G02F 1/1339
(52) U.S. Cl. ............................................................ 349/153
(58) Field of Search ................................... 349/153, 190

(56) References Cited

U.S. PATENT DOCUMENTS 5,798,813 A * 8/1998 Ohashi et al. .............. 349/154
6,057,898 A * 5/2000 Itoh et al. .................... 349/73
6,219,126 B1 * 4/2001 Von Gutfeld ............... 349/153
6,473,148 B1 * 10/2002 Suh ............................ 349/153

* cited by examiner

Primary Examiner—Robert H. Kim
Assistant Examiner—Richard H Kim

(57) ABSTRACT

The object of the invention is to provide a liquid crystal display device which can surely prevent a sealant from flowing into a display area. A liquid crystal display device comprising: two substrates 10, 20 in which a display area 11 is defined and which are overlaid with each other; at least two dam pattern structures 13d, 13d' being provided on at least one of the substrates or provided separately on both of the substrates, which have a pattern of surrounding the display area 11; and a sealant 12 applied to the outside of the dam pattern structures in a form of surrounding the dam pattern structures. The outer dam pattern structure 13d' adjacent to the sealant 12 has a plurality of slits 13s for causing the sealant 12 to pass therethrough.

10 Claims, 5 Drawing Sheets

LIQUID CRYSTAL DISPLAY DEVICE

BACKGROUND OF THE INVENTION

1. Field of the Invention

The invention relates to a liquid crystal display device, and in particular to a liquid crystal display device that is constructed through a fabrication process to apply a sealant to either or both of two liquid crystal medium sandwiching substrates for laminating those two substrates through a given gap, and for adhering to and sealing them, and then to actually laminate the substrates.

2. Description of Related Art

In a fabrication process for liquid crystal display panels, a sealant consisting of a material such as thermosetting resin paste is used as a material for bonding two panel substrates and for forming a chamber cell into which a liquid crystal material is sealed between the substrates. In general, a picture frame-like pattern of the sealant is printed so as to be located along the fringe of one of the substrates (in other words, so as to surround a display area keeping a given space to the display area). Then, this pattern-formed sealant, after some predetermined processes, is pressed against the other substrate and cured through a heating treatment so that a given gap (liquid crystal cell gap) is formed between the substrates in a substrate alignment process.

However, in these processes, there is a possibility of the sealant leaking or flowing into the display area because the sealant is pressed against the substrate in the substrate alignment process and the sealant may be liquefied or softened in the heating treatment. If the sealant flows into the display area, pixel-forming elements including a color filter arranged correspondingly to the display area and pixel electrodes connected to TFTs might be covered with such flowing sealant or the quality of such elements might be deteriorated, which may further result in the so-called dot defect of the displayed image.

One of the conventional countermeasures against such encroachment of the sealant into the display area has been to provide a much sufficient distance between the pattern-formed sealant and the display area.

However, because of the recent tendency to expand the display area, a (market) requirement that a distance between the sealant and the display area should be shortened (the so-called narrow frame form) has been getting more and more strong, and therefore it cannot be allowed anymore to disregard the aforementioned problem of the sealant leakage into the sealant. Thus, it is a pressing need to provide a technique for preventing the leakage of the sealant into the display area when the substrates are combined even if the sealant has been put on closely to the display area.

SUMMARY OF THE INVENTION

From the aforementioned viewpoints, it is an object of the invention to provide a liquid crystal display device in which the leakage of the sealant into the display area can be very surely prevented.

In order to accomplish the object, a liquid crystal display device of one aspect according to the invention is a liquid crystal display device comprising: two substrates in which a display area is defined and which are overlaid with each other; at least two dam pattern structures being provided on at least one of the substrates or provided separately on both of the substrates, which have a pattern of surrounding the display area; and a sealant applied to the outside of the dam pattern structures in such a manner that the sealant surrounds the dam pattern structures, wherein the outer dam pattern structure adjacent to the sealant has a plurality of slits (for causing the sealant to pass therethrough).

According to this aspect, the slits or gaps of the outer dam pattern structure cause the sealant to easily pass through a passage and a space between the inner dam pattern structure and the outer dam pattern structure when the substrates are combined and adhere to each other. So, it is possible to suppress leaking out of the sealant into the display area beyond the inner dam pattern structure, that would be caused for some reason.

In the above mentioned aspect, any inner dam pattern structure of the dam pattern structures except for the outer dam pattern structure may have a pattern of surrounding the display area in a generally continuous form.

Any inner dam pattern structure of the dam pattern structures except for the outer dam pattern structure may have a plurality of slits for causing the sealant to pass therethough.

In the above mentioned aspect, the dam pattern structures may consist of three dam pattern structures, and the innermost dam pattern structure thereof may have a pattern of surrounding the display area in a generally continuous form.

Then the dam pattern structures may consist of three dam pattern structures, and the central dam pattern structure thereof may have a pattern of surrounding the display area in a generally continuous form.

In order to achieve the above mentioned object, another aspect of liquid crystal display device according to the present invention is a liquid crystal display device comprising: two substrates in which a display area is defined and which are overlaid with each other; one or more dam pattern structures being provided on at least one of the substrates or provided separately on both of the substrates, which have a pattern of surrounding the display area; and a sealant applied to the outside of the dam pattern structures in a form of surrounding the dam pattern structures, wherein said one or more dam pattern structures comprise a dam pattern structure of column-shaped section having a cross-section connecting between mutually opposite faces of one and another of the substrates.

Accordingly, the column-shaped section dam pattern structure completely prevent the sealant from coming into the display area, so that the problems previous mentioned can be overcome. Furthermore, this aspect has an advantage that the column-shaped section dam pattern structure can determine a distance between the substrates at a fringe section of the substrates, whereby it will be useful for control/setting of a thickness of the liquid crystal cell.

In this aspect, the dam pattern structure of column-shaped section may have a pattern of surrounding the display area in a generally continuous form.

The one or more dam pattern structures may comprise: an inner dam pattern structure of column-shaped section having a cross-section connecting between mutually opposite faces of one and another of the substrates and having a pattern of surrounding the display area in a generally continuous form; and an outer dam pattern structure having a plurality of slits (for causing the sealant to pass therethrough) and being located on a side close to the sealant.

Here, the outer dam pattern structure may have a column-shaped cross-section connecting between mutually opposite faces of one and another of the substrates.

Furthermore, the one or more dam pattern structures may comprise: an inner dam pattern structure of column-shaped section having a cross-section connecting between mutually opposite faces of one and another of the substrates and having a plurality of slits; and an outer dam pattern structure of column-shaped section having a cross-section connecting between mutually opposite faces of one and another of the substrates, having a plurality of slits (for causing the sealant to pass therethrough) and being located on a side close to the sealant.

Preferably, intervals between the slits of the inner dam pattern structure of column-shaped section are longer than those between the slits of the outer dam pattern structure of column-shaped section, and the slits of the inner dam pattern structure of column-shaped section do not correspond to the slits of the outer dam pattern structure of column-shaped section.

DESCRIPTION OF THE PREFERRED EMBODIMENT(S)

The aspects mentioned above and the other aspects of the present invention will be described in more detail with reference to the accompanying drawings.

[Embodiment 1]

Figure 1:
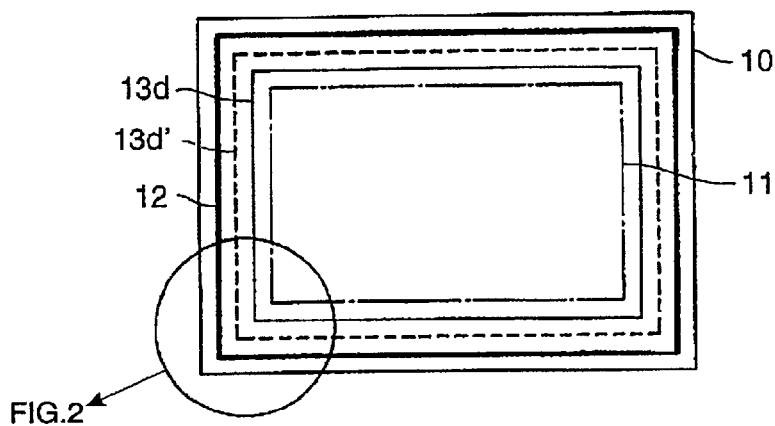
FIG. 1 is a plan view of a liquid crystal display panel, which is for explaining the outline of dam pattern (structures) according to the invention.
Figure 2:
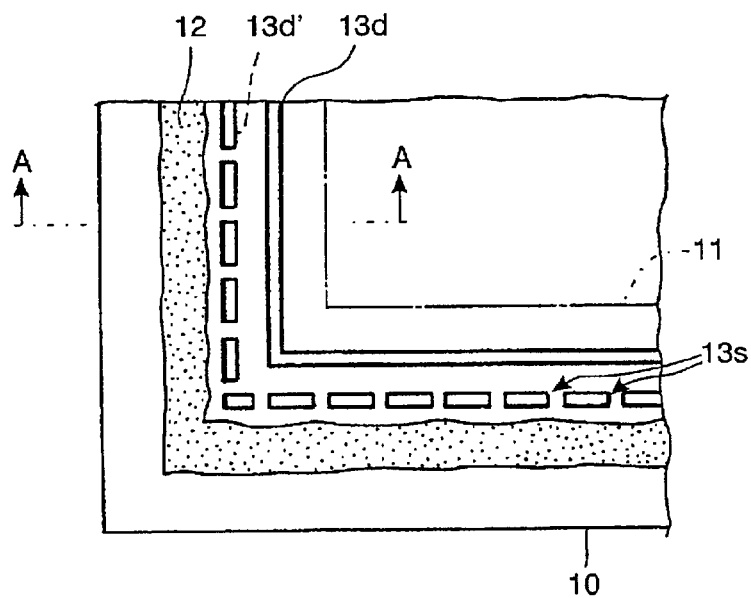
FIG. 2 is a partially enlarged plan view of a display panel, which schematically shows a form of dam patterns and a sealant according to the first embodiment of the invention.
Figure 3:
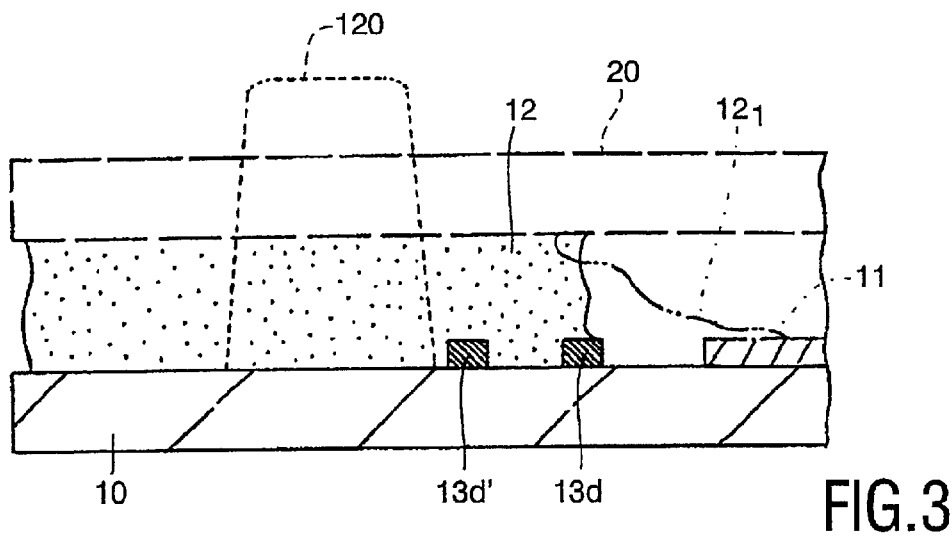
FIG. 3 is a cross-sectional view at A—A of FIG. 2 to explain the changing of form of the sealant after the process of combining the substrates and the effects and advantages of the invention.

FIG. 1 shows in a plan view one of the panel substrates 10 to be used in one embodiment of a liquid crystal display device according to the invention, FIG. 2 is an enlarged view of the lower-left corner of FIG. 1, and FIG. 3 is an A—A cross sectional view of FIG. 2.

It should be noted that the one panel substrate 10 is combined with another panel substrate 20 (see FIG. 3) located opposite to the one panel substrate 10, and a liquid crystal medium is sealed between those substrates to construct a final liquid crystal display device (panel). Besides, it is assumed that the one panel substrate 10 is a substrate in which a color filter is formed.

In FIGS. 1–3, a given display area 11 is defined in the panel substrate 10 and an image to be displayed is formed within this display area 11. More specifically, the display area 11 in this example corresponds to an area in which the color filter having a pattern of color elements corresponding to color pixels is formed.

Around the display area 11, there are formed an inner dam pattern structure 13d adjacent to the display area 11 and an outer dam pattern structure 13d' that is located nearer to a side edge of the panel (a term "structure" will be omitted as appropriate, hereinafter), the dam patterns being separated at respective predetermined distances from the display area 11. The inner dam pattern 13d has a pattern of surrounding the display area 11 in a generally continuous form. On the other hand, although the outer dam pattern 13d' surrounds the display area 11 in the outside of the dam pattern 13d in the almost same manner. However, the dam pattern 13d' is not continuous but has a pattern including discontinued portions 13s (referred to as "slits", hereinafter). Such slits are only required to appear appropriately scattered when they are observed from a plan view, and in this example the slits are disposed with generally equal intervals (see FIG. 2).

The dam patterns 13d and 13d' can be formed in a layer of the same level as the display area (color filter) 11 as illustrated in FIG. 3. As for material, the dam patterns 13d and 13d' can be formed from much the same material as used for the color filter or from any other materials including synthetic resins, pigments or metals. Prior to coating of a sealant 12, the dam patterns 13d and 13d' are beforehand formed on the substrate 10 either along with or separately from the color filter formation by means of, for example, an etching process.

The outside of the dam pattern 13d' is coated with the sealant 12 in such a manner that the sealant 12 surrounds the dam pattern 13d'. For the sealant 12 not only a thermosetting resin as in this example may be used but also any UV setting resins or any other alternative materials.

FIGS. 1 and 2 illustrate a state of the sealant 12 before a substrate alignment process. At this point, the sealant 12 still retains its pattern shape as it has been printed.

Figure 4:
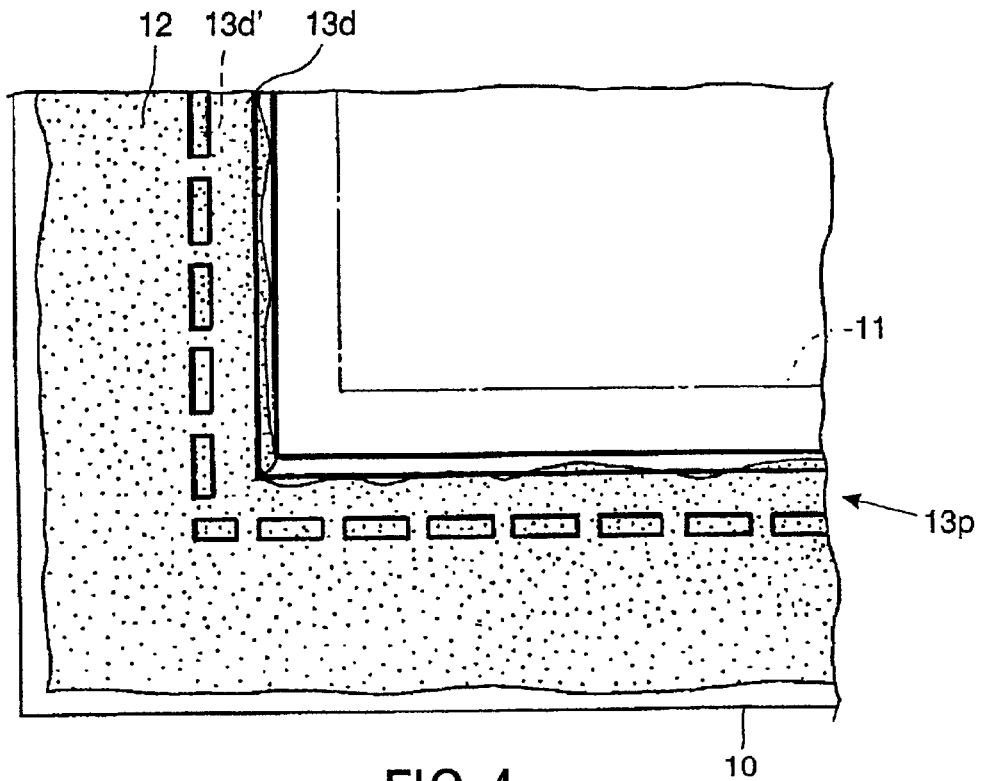
FIG. 4 is a partially enlarged plan view of a display panel, which schematically shows a form of dam patterns and a sealant after the process of combining the substrates according to the first embodiment of the invention.

FIGS. 3 and 4 illustrate a state of the sealant 12 after the substrate alignment process. In FIG. 3. a sealant 120 is shown (by the broken line) which represents its state just after the pattern has been printed. When the sealant of such condition is subjected to the substrate combination (alignment) process wherein the substrate 10 is overlaid with another substrate 20, the sealant 12 will be pressed against the substrate 10 and be forcedly sandwiched between the substrates 10 and 20 so that the sealant 12 may be extended in directions parallel to the primary plane of the substrates (e.g. the left and right directions in FIG. 3). Then, the sealant 12 will be further softened and extended through the subsequent sealant heating process. As a result, the sealant 12 may not only extend toward the outer fringe of the panel but also flow out to a side of the inner dam pattern 13d through the slits of the outer dam pattern 13d'.

It should be particularly noted that the sealant 12 may easily flow into a path or a space 13p formed between the inner dam pattern 13d and easiness the outer dam pattern 13d' through the slits 13s, and this easiness relies on the slit 13s which are provided in the outer dam pattern 13d'. In accordance with such structure, even if the sealant 12 is strongly pressed during the substrate alignment process or it is liquefied or softened eruptively during the heating process, the sealant 12 may be prevented from flowing into the display area 11 locally beyond the dam 13d for some reasons, as illustrated in FIG. 5 or by a dash-doubledot line 12, in FIG. 3.

Thus, even if the sealant 12 is put on near to the display area 11, the probability of leakage of the sealant 12 into the display area 11 can become lower, so that it is possible to finely expand the display area while the occurrence of the aforementioned dot defects is avoided.

Figure 5:
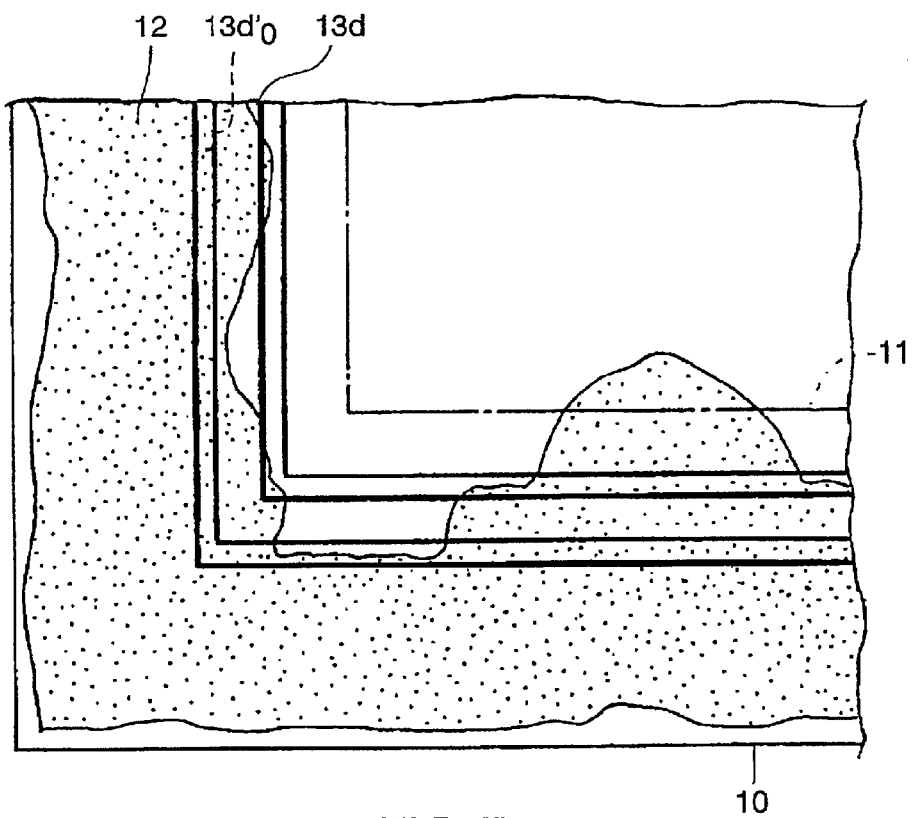
FIG. 5 is a partially enlarged plan view of a display panel, which schematically shows a form of dam patterns and a sealant after the process of combining the substrates according to a comparative example.

It should be noted that FIG. 5 illustrates a structure in which an outer dam pattern $13d_0$ comprises no slit.

[Embodiment 2]

Figure 6:
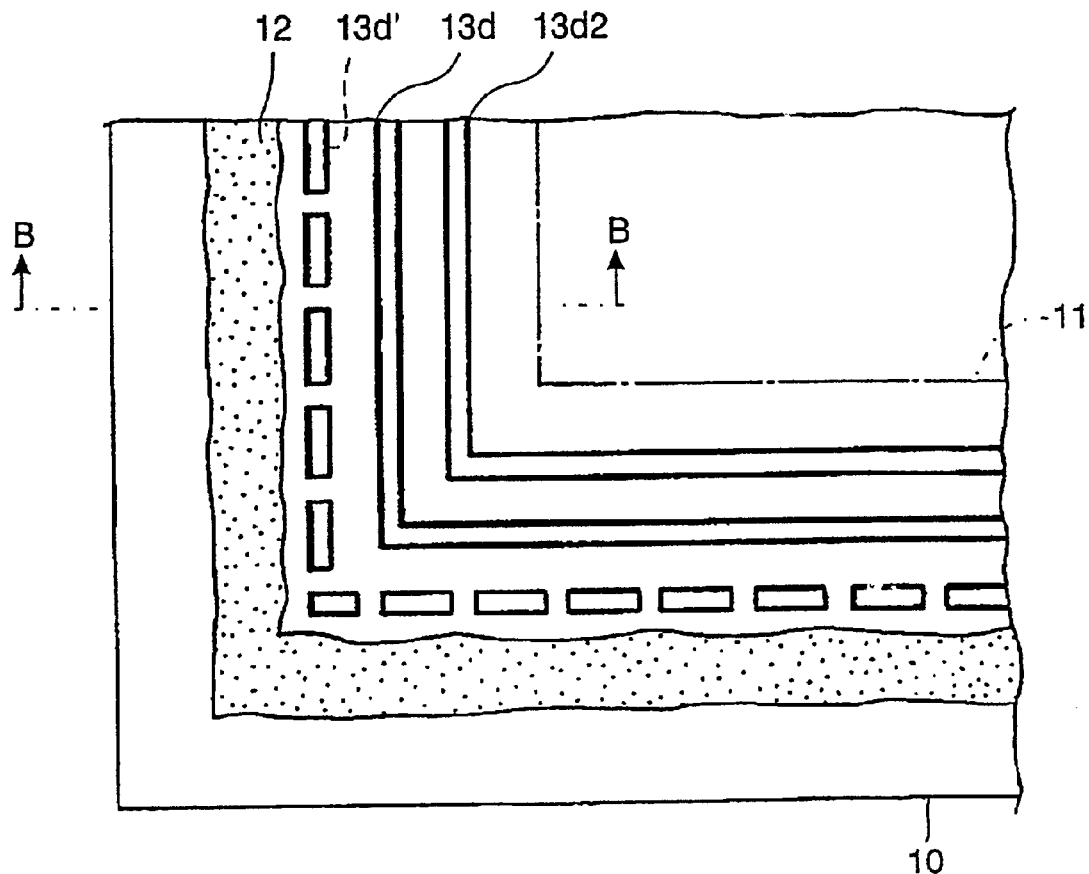
FIG. 6 is a partially enlarged plan view of a display panel, which schematically shows a form of dam patterns and a sealant according to the second embodiment of the invention.
Figure 7:
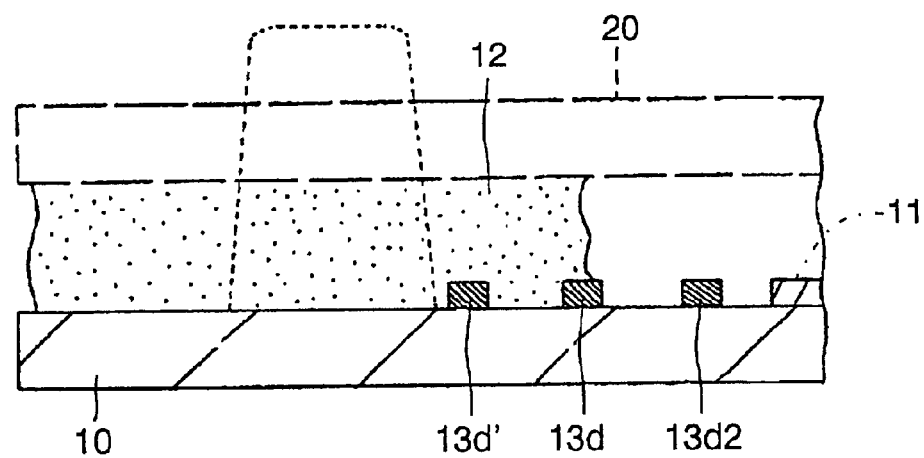
FIG. 7 is a cross-sectional view at B—B of FIG. 6 to explain the changing of form of the sealant and the effects and advantages of the invention.

FIG. 6 illustrates a schematic plan view of a structure of one panel substrate, dam patterns and a sealant formed on that substrate, which are used for a liquid crystal display device according to the other one embodiment of the invention. FIG. 7 illustrates a cross sectional view from the B—B line of FIG. 6, where the substrates have been combined together.

In addition to the aforementioned dam patterns 13d, 13d', the dam patterns illustrated in FIGS. 6 and 7 further comprise a dam pattern $13d_2$ that is disposed on the inner side of the dam patterns 13d and 13d'. The inner dam pattern $13d_2$ is provided to complement the first embodiment and has a pattern of surrounding the display area in a generally continuous form in the same manner as for the inner dam pattern 13d. Also, formation and material of the dam pattern $13d_2$ are the same as the dam patterns 13d, 13d'.

According to this second embodiment, the extra dam pattern $13d_2$ is provided so as to play a role as a stopper for damming off leakage of the sealant 12 beyond the dam pattern 13d in case of accidental happening. By virtue of this structure, it can be further assured that the sealant 12 would be prevented from flowing into the display area 11.

[Embodiment 3]

Figure 8:
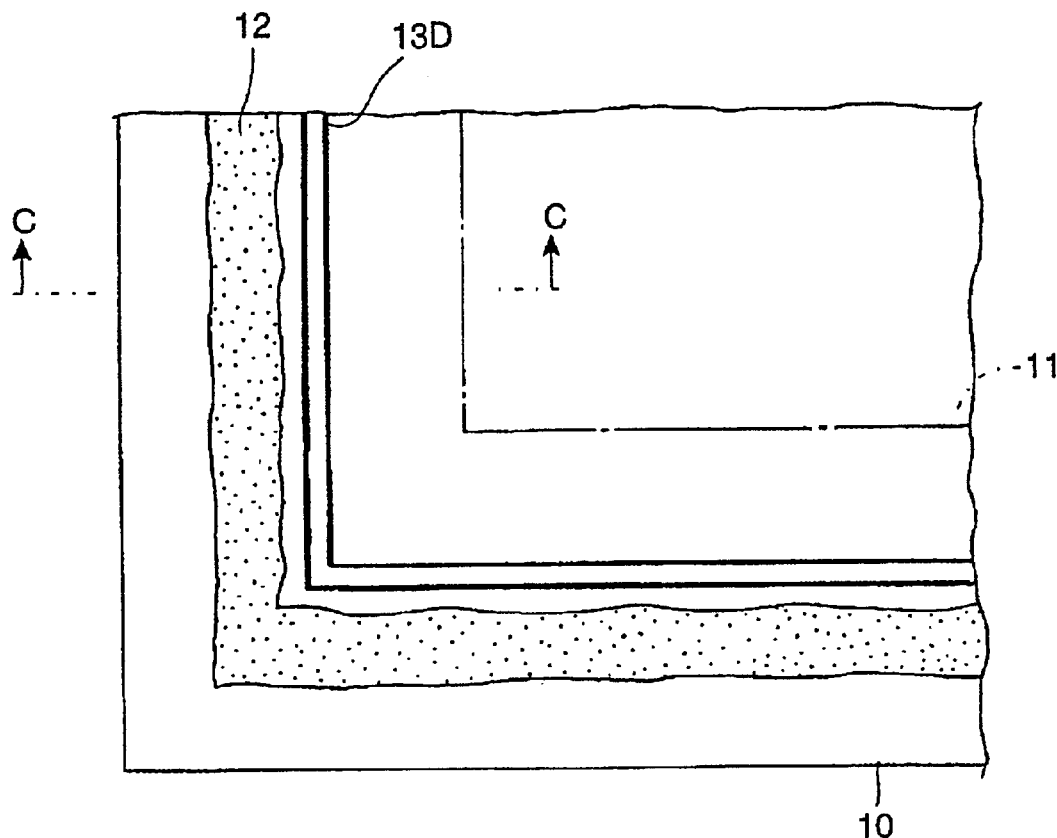
FIG. 8 is a partially enlarged plan view of a display panel, which schematically shows a form of a column-shaped section dam pattern and a sealant according to the third embodiment of the invention.
Figure 9:
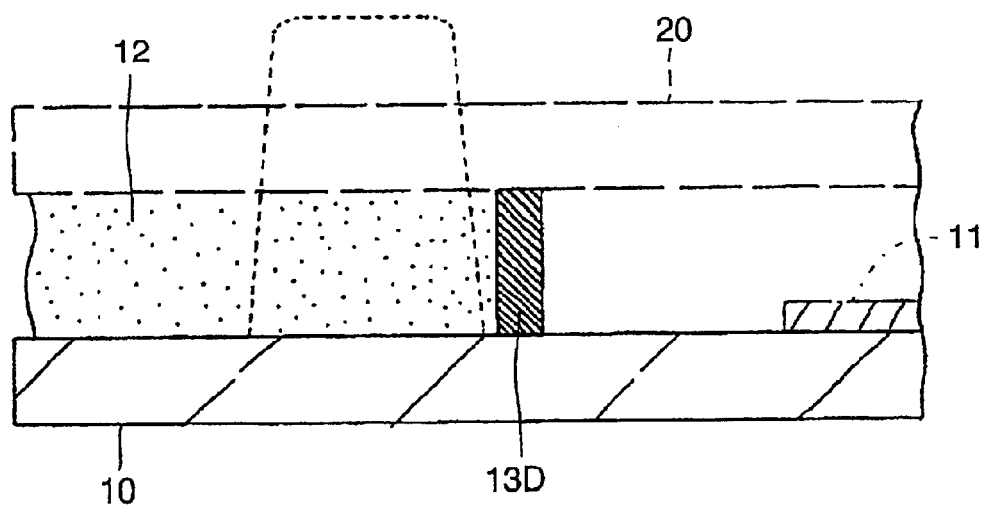
FIG. 9 is a cross-sectional view at C—C of FIG. 8 to explain the changing of form of the sealant after the process of combining the substrates and the effects and advantages of the invention.

FIG. 8 illustrates a schematic plan view of a structure of one panel substrate, a dam pattern and a sealant formed on that substrate, which are used for a liquid crystal display device according to a further embodiment of the invention. FIG. 9 illustrates a cross sectional view from the C—C line of FIG. 7, where the substrates have been combined together.

A dam pattern 13D in FIGS. 8 and 9 is equivalent to the aforementioned dam patterns 13d, 13d', $13d_2$ in that it has a cross section extending in a direction perpendicular to the primary plane of the substrate for blocking the sealant 12, but it is different from them in that it has a column-shaped cross-section connecting between mutually opposite faces of one and another of the substrates 10 and 20.

Such a dam pattern 13D is completely engaged between the substrates to block any stream of the sealant 12. Therefore, no leakage of the sealant 12 into the display area should occur.

However, the sealant 12 is usually considered to be fluid. So, if the dam pattern 13D shuts between the substrates airtightly, during the substrate alignment process the air included in the sealant 12 cannot be easily exhausted in the vicinity of the wall face of the dam pattern whereby the cured sealant may have some air bubbles. In view of this respect, the following embodiment may be adopted.

[Embodiment 4]

Figure 10:
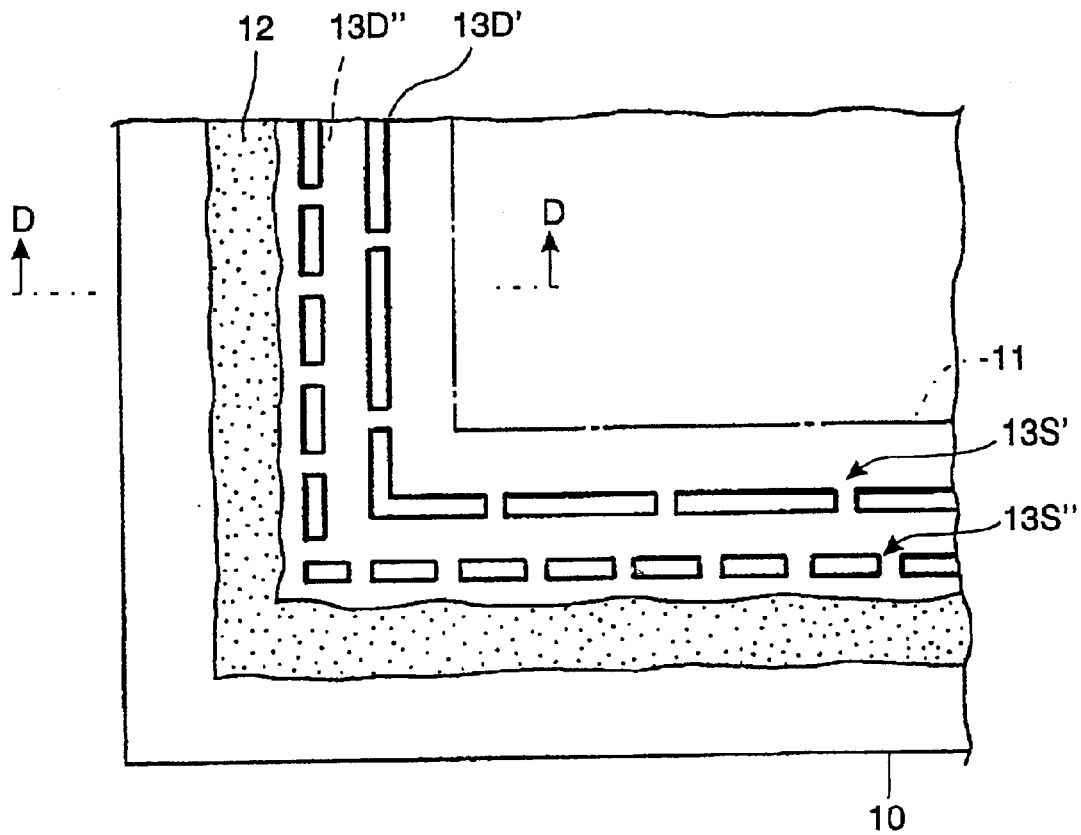
FIG. 10 is a partially enlarged plan view of a display panel, which schematically shows a form of column-shaped section dam patterns and the sealant according to the forth embodiment of the invention.
Figure 11:
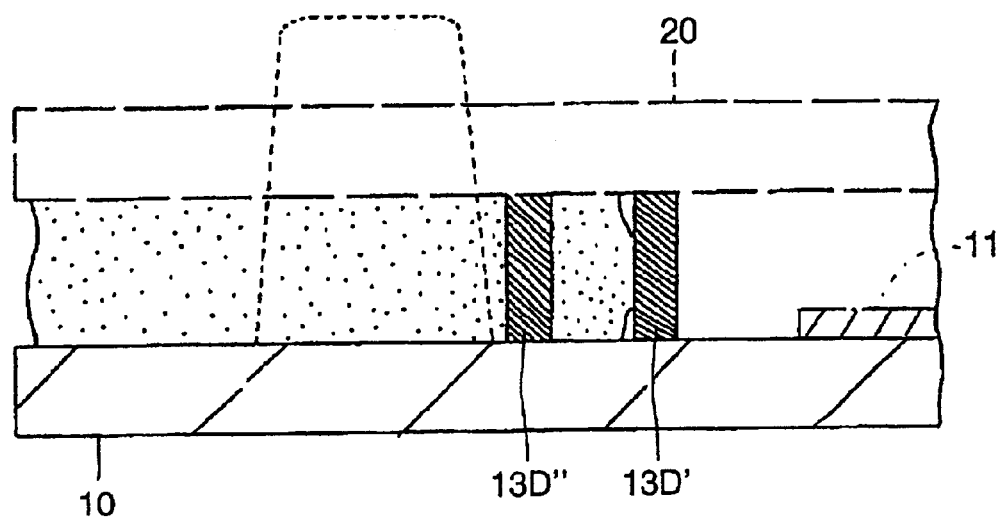
FIG. 11 is a cross-sectional view at D—D of FIG. 10 to explain the changing of form of the sealant after the process of combining the substrates and the effects and advantages of the invention.

FIG. 10 illustrates a schematic plan view of a structure of one panel substrate, dam patterns and a sealant formed on that substrate, which are used for a liquid crystal display device according to yet another embodiment of the invention. FIG. 11 illustrates a schematic cross sectional view from the D—D line of FIG. 10, where the substrates have been combined together.

The dam patterns shown in FIGS. 10 and 11 comprise an outer dam pattern 13D" having slits 13S" that have the same function as the slits 13s for the aforementioned dam pattern 13d' and an inner dam pattern 13D' having slits 13S' for exhausting the air. Each of these dam patterns 13D", 13D' has a cross-section connecting between mutually opposite faces of one and another of the substrates 10 and 20. In particular, as shown in FIG. 10, the slits 13S' of the dam pattern 13D' and the slits 13S" of the dam pattern 13D" are positioned so as not to correspond to each other. Furthermore, in this example, the intervals between the slits 13S" are set to be longer than those between the slits 13S'.

By virtue of such structure, the sealant could more easily pass through the slits 13S" of the outer dam pattern 13D", and accordingly the air could be more easily exhausted, so that the generation of the air bubbles as mentioned above can be prevented in the finished product.

[Variations]

Although in the above embodiments it has been assumed that one of the substrates is a panel substrate (front substrate) in which the color filter has been formed, the dam patterns shown in the Embodiments 1–4 may be disposed on another substrate opposite to the front substrate (rear substrate in which, for example, thin film transistors for driving pixels are formed). Also, the coating of the sealant 12 on the front substrate is not limited. Instead, the sealant 12 may be put on only the rear substrate, and may be put on both substrates.

Moreover, such dam patterns as shown in the Embodiments 1 and 2 may be applied to both of the front and rear substrates. In this case, the effect of preventing the leakage of the sealant into the display area could be more enhanced. Also, it is a matter of course that each of such dam patterns as shown in the Embodiments 1, 2 and 4 may be individually applied to either front substrate or rear substrate, as appropriate.

Besides, although the number of the dam patterns shown in the aforementioned embodiments has been one to three, any number of the dam patterns may be applicable to the invention. The invention essentially aims to provide a constitution with certain contrivance for preventing the leakage of the sealant into the display area. Therefore, it should be noted that the concept of the invention is not to focus on the number of the dam patterns but to prevent unexpected local flow of the sealant into the display area. And to this end, it is proposed to provide slits to the dam pattern located relatively near to the sealant side in the case of two or more fence-like cross-section dam patterns having cross sections that extend in a direction perpendicular to a main surface of the substrate terminating at an intermediate position between the substrates, or to provide a dam pattern itself having a column-shaped section connecting between mutually opposite faces of one and another of the substrates.

Furthermore, in the Embodiments 1 and 2, only purport based on a combination of the intermittent dam pattern with some slits and the continuous dam pattern without any slits has been introduced, but, in accordance with purport based on the embodiment of FIG. 10, another combination in which only intermittent dam patterns are combined may be possible.

Nothing to say, any other various variations may be implemented in the invention. For example, the sealant may comprise an ultraviolet curing (setting) resin, and the invention may be applicable to any other substrates in which the color filter and the display area are not matched each other.

Furthermore, although this specification has descriptions that the sealant takes a shape surrounding the display area at its application stage, the cured sealant, in fact, is usually a frame-shaped pattern having some opening portion for implanting the liquid crystal medium. This specification does not refer to this respect for the simplification purpose. In addition, such dam patterns as mentioned in the Embodiments 3 and 4 have to make allowances for such implantation of the liquid crystal material, but in these embodiments the corresponding description also has been omitted.

The preferred embodiments described herein are therefore illustrative and not restrictive, the scope of the invention being indicated by the appended claims and all variations which come within the meaning of the claims are intended to be embraced therein.

What is claimed is:

1. A liquid crystal display device comprising:
   two substrates in which a display area is defined and which are overlaid with each other;
   at least two dam pattern structures being provided on at least one of the substrates or provided separately on both of the substrates, which have a pattern of surrounding the display area; and
   a sealant applied to the outside of the dam pattern structures in such a manner that the sealant surrounds the dam pattern structures,
   wherein the outer dam pattern structure adjacent to the sealant has a plurality of slits.

2. A device as defined in claim 1, wherein any inner dam pattern structure of the dam pattern structures except for the outer dam pattern structure continuously surrounds the display area.

3. A device as defined in claim 1, wherein an inner dam pattern structure has a plurality of slits.

4. A device as defined in claim 1, wherein the dam pattern structures include three dam pattern structures, and the innermost dam pattern structure continuously surrounds the display area.

5. A device as defined in claim 4, wherein the dam pattern structures consist of three dam pattern structures, and the central dam pattern structure continuously surrounds the display area.

6. A liquid crystal display device comprising:
   two substrates in which a display area is defined and which are overlaid with each other;
   an outer dam pattern structure provided on at least one of the substrates or provided separately on both of the substrates, and which surrounds the display area, said outer dam pattern structure having a plurality of slits; and
   a sealant applied outside of the outer dam pattern structure in a form of surrounding the outer dam pattern structure,
   wherein said outer dam pattern structure includes a column-shaped section having a cross-section connecting between mutually opposite faces of one end another of the substrates.

7. A liquid crystal display device according to claim 6, wherein the dam pattern structure of column-shaped section have a pattern of surrounding the display area in a generally continuous form.

8. A liquid crystal display device according to claim 6, further including an inner dam pattern structure of column-shaped section having a cross-section connecting mutually opposite faces of one and another of the substrates and having a pattern of surrounding the display area in a generally continuous form; and
   wherein the outer dam pattern structure having a plurality of slits and being located on a side close to the sealant.

9. A liquid crystal display device according to claim 8,
   wherein said inner dam pattern structure of column-shaped section having a cross-section connecting mutually opposite faces of one and another of the substrates and having a plurality of slits; and
   an outer dam pattern structure of column-shaped section having a cross-section connecting mutually opposite faces of one and another of the substrates, having a plurality of slits and being located on a side close to the sealant.

10. A liquid crystal display device according to claim 9, wherein the silts of the inner dam pattern structure of column-shaped section are longer than those between the slits of the outer dam pattern structure of column-shaped section, and the slits of the inner dam pattern structure of column-shaped section and the slits of the outer dam pattern structure of column-shaped section are not aligned.

* * * * *